US011455007B2

(12) United States Patent
Feng et al.

(10) Patent No.: US 11,455,007 B2
(45) Date of Patent: Sep. 27, 2022

(54) SUPPORT PLATES, DISPLAY APPARATUSES AND ELECTRONIC DEVICES

(71) Applicants: Chengdu BOE Optoelectronics Technology Co., Ltd., Chengdu (CN); BOE Technology Group Co., Ltd., Beijing (CN)

(72) Inventors: Binfeng Feng, Beijing (CN); Fei Li, Beijing (CN); Yupeng Chen, Beijing (CN); Zhihao Xie, Beijing (CN); Yawen Chen, Beijing (CN); Xinjie Mao, Beijing (CN); Bowen Xiao, Beijing (CN)

(73) Assignees: Chengdu BOE Optoelectronics Technology Co., Ltd., Chengdu (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/359,601

(22) Filed: Jun. 27, 2021

(65) Prior Publication Data

US 2022/0057835 A1 Feb. 24, 2022

(30) Foreign Application Priority Data

Aug. 24, 2020 (CN) .......................... 202010859779.8

(51) Int. Cl.
*G06F 3/041* (2006.01)
*G06F 1/16* (2006.01)
(52) U.S. Cl.
CPC .......... *G06F 1/1616* (2013.01); *G06F 1/1652* (2013.01)

(58) Field of Classification Search
CPC ...... G09F 9/301; G06F 1/1616; G06F 1/1641; G06F 1/1652; G06F 1/1675
See application file for complete search history.

(56) References Cited

U.S. PATENT DOCUMENTS

| 2018/0006272 | A1* | 1/2018 | Lee | ..................... | H01L 27/3272 |
| 2018/0130856 | A1* | 5/2018 | Kim | .................... | H01L 27/3279 |
| 2019/0196548 | A1* | 6/2019 | Kim | ........................ | G09F 9/301 |
| 2020/0006397 | A1* | 1/2020 | Park | ..................... | H01L 27/1244 |

FOREIGN PATENT DOCUMENTS

KR 20200071604 A * 6/2020

* cited by examiner

*Primary Examiner* — Joe H Cheng
(74) *Attorney, Agent, or Firm* — IPRO, PLLC

(57) ABSTRACT

Provided are a support plate, a display apparatus and an electronic device. The support plate includes flat regions including first and second flat regions spaced apart along a first direction, a bendable region between the first and second flat regions, and a pattern region covering at least the bendable region. A plurality of hole groups arranged along the first direction are disposed in the pattern region, and each hole group includes a plurality of holes at intervals along a second direction. At least two of holes in part of the pattern region covering the bendable region are oblique holes, and central axes of the oblique holes intersect with a thickness direction of the bendable region at a non-zero included angle. The central axes of the oblique holes are located in a first datum plane, and the bendable region bends along the thickness direction perpendicular to the first and second directions.

20 Claims, 4 Drawing Sheets

SUPPORT PLATES, DISPLAY APPARATUSES AND ELECTRONIC DEVICES

CROSS REFERENCE TO RELATED APPLICATIONS

This application claims priority to Chinese Patent Application No. 2020108597798 entitled "SUPPORT PLATES, DISPLAY APPARATUSES AND ELECTRONIC DEVICES" filed on Aug. 24, 2020, the entire content of which is incorporated herein by reference.

TECHNICAL FIELD

The present disclosure relates to the field of display technologies, and in particular to a support plate, a display apparatus and an electronic device.

BACKGROUND

In a foldable phone, a display panel of the foldable phone is supported by a reinforcing steel sheet. As a result, the bending performance of the reinforcing steel sheet may affect the performance of the foldable phone.

SUMMARY

An aspect of the present application provides a support plate, comprising:

a plurality of flat regions, comprising a first flat region and a second flat region spaced apart along a first direction;

a bendable region, connected between the first flat region and the second flat region;

a pattern region, covering at least the bendable region, where a plurality of hole groups arranged along the first direction are disposed in the pattern region, each of the hole groups comprises a plurality of holes spaced at intervals along a second direction, at least two of the plurality of holes in a part of the pattern region covering the bendable region are formed into oblique holes, a central axis of each of the oblique holes intersects with a thickness direction of the bendable region at a non-zero comprised angle, where the second direction is perpendicular to the first direction, the central axis of each of the oblique holes is located in a first datum plane which is parallel to a plane formed by intersecting the thickness direction of the bendable region with the first direction;

where the bendable region bends along the thickness direction perpendicular to the first direction and the second direction.

Optionally, a plurality of holes of at least one of a plurality of hole groups in the part of the pattern region covering the bending region are formed into oblique holes.

Optionally, the comprised angle α between the central axis of each of the oblique holes and the thickness direction of the bendable region satisfies 0°<α≤45°.

Optionally, a plurality of holes in the part of the pattern region covering the bendable region are formed into through holes; or, the plurality of holes in the part of the pattern region covering the bendable region are formed into blind holes; or, at least one of the plurality of holes in the part of the pattern region covering the bendable region is formed into a through hole, and at least one of the plurality of holes is formed into a blind hole.

Optionally, the pattern region comprises a first pattern region and a second pattern region, a plurality of hole groups are disposed in each of the first pattern region and the second pattern region, the first pattern region covers the bendable region, and the second pattern region covers a part of at least one of the first flat region and the second flat region.

Optionally, an area of the pattern region does not exceed ⅓ of a sum of areas of the flat region and the bendable region.

Optionally, the plurality of holes in the pattern region are all formed into the oblique holes; or, at least two of the plurality of holes in the part of the pattern region covering the bendable region are formed into straight holes, and a central axis of each of the straight holes is parallel to the thickness direction of the bendable region.

Optionally, the bendable region has a centerline which extends along the second direction, and the plurality of hole groups are disposed symmetrical about the centerline.

Optionally, the bendable region comprises a central bendable region and a plurality of transitional bendable regions arranged along the first direction, the plurality of transitional bendable regions comprise a first transitional bendable region and a second transitional bendable region, where the first transitional bendable region and the second transitional bendable region are disposed at both sides of the central bendable region along the first direction and are symmetrical about the central bendable region, where the first transitional bendable region is connected between the central bendable region and the first flat region, the second transitional bendable region is connected between the central bendable region and the second flat region, a plurality of hole groups are disposed in each of the central bendable region and the transitional bendable regions, and a plurality of holes in the plurality of hole groups in the transitional bendable regions are formed into the oblique holes.

Optionally, the holes in the central bendable region are all formed into straight holes, and central axes of the straight holes are parallel to the thickness direction of the bendable region; or, the holes in the central bendable region are all formed into oblique holes, and the central axes of the oblique holes in the central bendable region are all in a second datum plane which is parallel to a plane formed by intersecting the thickness direction of the bendable region with the second direction.

Optionally, the oblique holes in the first transitional bendable region comprise first oblique holes and second oblique holes, and central axes of the first oblique holes are not parallel to central axes of the second oblique holes;

the oblique holes in the second transitional bendable region comprise third oblique holes and fourth oblique holes, and central axes of the third oblique holes are not parallel to central axes of the fourth oblique holes.

Optionally, in the first direction, the second oblique holes are located between the first oblique holes and the central bendable region, and in the first direction, the fourth oblique holes are located between the third oblique holes and the central bendable region;

where an comprised angle α1 between the central axes of the first oblique holes and the thickness direction of the bendable region is smaller than an comprised angle α2 between the central axes of the second oblique holes and the thickness direction of the bendable region, and an comprised angle α3 between the central axes of the third oblique holes and the thickness direction of the bendable region is smaller than an comprised angle α4 between the central axes of the fourth oblique holes and the thickness direction of the bendable region; or, the comprised angle α1 between the central axes of the first oblique holes and the thickness direction of the bendable region is greater than the comprised angle α2 between the central axes of the second oblique holes and the thickness direction of the bendable region, and the comprised angle α3 between the central axes of the third oblique holes and the thickness direction of the bendable region is greater than the comprised angle α4 between the central axes of the fourth oblique holes and the thickness direction of the bendable region.

Optionally, the first transitional bendable region comprises a first transition region and a second transition region disposed along the first direction, an end of the first transition region away from the second transition region is connected with the first flat region, an end of the second transition region away from the first transition region is connected with the central bendable region, the oblique holes in the first transition region are all the first oblique holes, and the oblique holes in the second transition region are all the second oblique holes;

the second transitional bendable region comprises a third transition region and a fourth transition region disposed along the first direction, an end of the third transition region away from the fourth transition region is connected with the second flat region, an end of the fourth transition region away from the third transition region is connected with the central bendable region, the oblique holes in the third transition region are all the third oblique holes, and the oblique holes in the fourth transition region are all the fourth oblique holes.

Another aspect of the present application provides a display apparatus, comprising a display panel and a support plate, where the support plate comprises:

a plurality of flat region, comprising a first flat region and a second flat region spaced apart along a first direction;

a bendable region, connected between the first flat region and the second flat region;

a pattern region, covering at least the bendable region, where a plurality of hole groups arranged along the first direction are disposed in the pattern region, each of the hole groups comprises a plurality of holes spaced at intervals along a second direction, at least two of the plurality of holes in a part of the pattern region covering the bendable region are formed into oblique holes, a central axis of each of the oblique holes intersects with a thickness direction of the bendable region at a non-zero comprised angle, where the second direction is perpendicular to the first direction, the central axis of each of the oblique holes is located in a first datum plane which is parallel to a plane formed by intersecting the thickness direction of the bendable region with the first direction;

the bendable region bends along the thickness direction which is perpendicular to the first direction and the second direction, and the support plate is supported at a back side of the display panel.

Optionally, a back film and a heat dissipating film layer are disposed between the display panel and the support plate, where the back film is located between the display panel and the heat dissipating film layer, where a touch module, a light filtering module and a cover plate are disposed at a front side of the display panel, the touch module and the light filtering module are both located between the display panel and the cover plate, and the touch module is located between the light filtering module and the display panel.

Optionally, the comprised angle α between the central axis of each of the oblique holes and the thickness direction of the bendable region satisfies 0°<α≤45°.

Optionally, the plurality of holes in the pattern region are all formed into the oblique holes; or, at least two of the plurality of holes in the part of the pattern region covering the bendable region are formed into straight holes, and a central axis of each of the straight holes is parallel to the thickness direction of the bendable region.

Optionally, the bendable region comprises a central bendable region and a plurality of transitional bendable regions arranged along the first direction, the plurality of transitional bendable regions comprise a first transitional bendable region and a second transitional bendable region, where the first transitional bendable region and the second transitional bendable region are disposed at both sides of the central bendable region along the first direction and are symmetrical about the central bendable region, where the first transitional bendable region is connected between the central bendable region and the first flat region, the second transitional bendable region is connected between the central bendable region and the second flat region, a plurality of hole groups are disposed in each of the central bendable region and the transitional bendable regions, and a plurality of holes in the plurality of hole groups in the transitional bendable regions are formed into the oblique holes.

Optionally, the oblique holes in the first transitional bendable region comprise first oblique holes and second oblique holes, and central axes of the first oblique holes are not parallel to central axes of the second oblique holes;

the oblique holes in the second transitional bendable region comprise third oblique holes and fourth oblique holes, and central axes of the third oblique holes are not parallel to central axes of the fourth oblique holes;

in the first direction, the second oblique holes are located between the first oblique holes and the central bendable region, and in the first direction, the fourth oblique holes are located between the third oblique holes and the central bendable region;

where an comprised angle α1 between the central axes of the first oblique holes and the thickness direction of the bendable region is smaller than an comprised angle α2 between the central axes of the second oblique holes and the thickness direction of the bendable region, and an comprised angle α3 between the central axes of the third oblique holes and the thickness direction of the bendable region is smaller than an comprised angle α4 between the central axes of the fourth oblique holes and the thickness direction of the bendable region; or, the comprised angle α1 between the central axes of the first oblique holes and the thickness direction of the bendable region is greater than the comprised angle α2 between the central axes of the second oblique holes and the thickness direction of the bendable region, and the comprised angle α3 between the central axes of the third oblique holes and the thickness direction of the bendable region is greater than the comprised angle α4 between the central axes of the fourth oblique holes and the thickness direction of the bendable region.

Still another aspect of the present application provides an electronic device, comprising the display apparatus according to any of the above examples.

DETAILED DESCRIPTION

Figure 1:
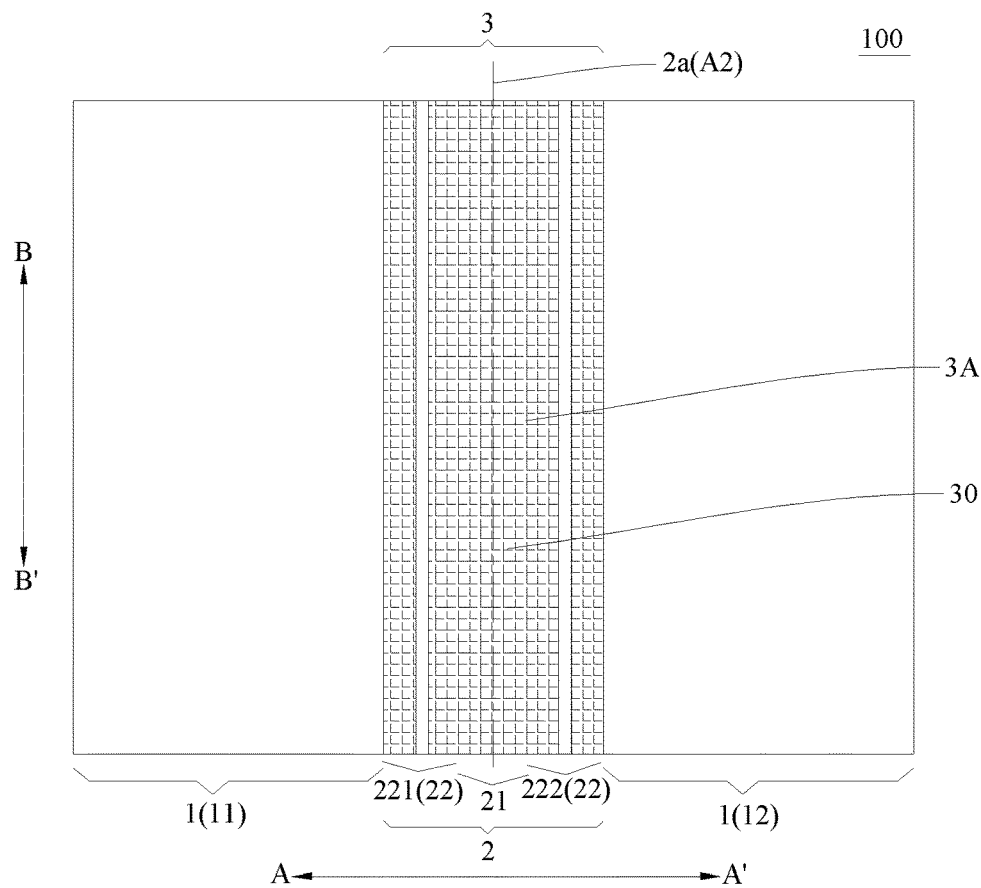
FIG. 1 is a schematic diagram of a support plate according to an embodiment of the present disclosure.

The embodiments of the present disclosure will be described below in details with the examples thereof shown in the accompanying drawings, and the same or similar reference numerals represent same or similar elements or elements have same or similar function throughout the specifications. The embodiments described below by referring to the accompanying drawings are merely illustrative to explain the present disclosure rather than limit the present disclosure.

The following descriptions of the present disclosure provide many different embodiments or examples to realize different structures of the present disclosure. In order to simplify the descriptions of the present disclosure, descriptions will be made below to those components or settings of specific examples. Of course, these embodiments are merely illustrative and not intended to limit the present disclosure. Furthermore, the present disclosure may reference digits and/or letters repeatedly in different embodiments. This repetition is used for simplification and clarification only rather than indicating any relationship between various embodiments and/or settings discussed. Furthermore, the present disclosure provides the examples of various specific processes and materials, but those skilled in the art may know the applicability of other processes and/or use of other materials.

A support plate 100 according to an embodiment of the present disclosure will be described below by referring to the accompanying drawings. The support plate 100 may be used in a foldable device, for example, a foldable phone, to support a display panel. Not limited to the above, the support plate 100 may be used, for example, to bend a display panel and the like. In the subsequent descriptions of the present disclosure, explanations are made with the support plate 100 being applied to a flexible display panel.

Figure 2:
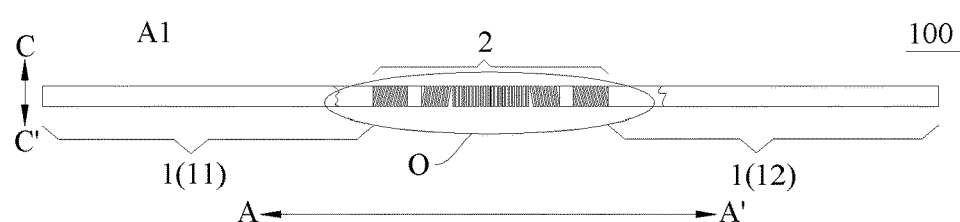
FIG. 2 is another schematic diagram of the support plate shown in FIG. 1.

As shown in FIGS. 1 and 2, the support plate 100 includes a plurality of flat regions 1, a bendable region 2 and a pattern region 3. The plurality of flat regions 1 includes a first flat region 11 and a second flat region 12 spaced apart along a first direction (e.g. a direction AA' indicated in FIG. 1). The bendable region 2 is connected between the first flat region 11 and the second flat region 12, and the bendable region 2 may bend along a thickness direction. The bendable region 2, for example, may both extend and bend. The pattern region 3 at least covers the bendable region 2, and thus an area of the pattern region 3 is greater than or equal to an area of the bendable region 2.

As shown in FIG. 1, a plurality of hole groups 3A arranged along the first direction are disposed in the pattern region 3, and each of the plurality of hole groups 3A includes a plurality of holes 30 at intervals along a second direction (e.g. direction BB' indicated in FIG. 1). At least two of a plurality of holes 30 in a part of the pattern region 3 covering the bendable region 2 are formed as oblique holes 30a, and a central axis L1 of the oblique hole 30a intersects with a thickness direction of the bendable region 2 (e.g. the direction CC' indicated in FIG. 2 when the support plate 100 is in a flat-extended state) at a non-zero included angle, that is, the central axis L1 of the oblique hole 30a intersects with a thickness direction of a part of the support plate 100 located in the bendable region 2 at a non-zero included angle. The second direction is perpendicular to the first direction, the central axis L1 of the oblique hole 30a is located in a first datum plane A1 (e.g. a plane of the paper where the structure shown in FIG. 2 is located), and the first datum plane A1 is parallel to a plane formed by intersecting the thickness direction of the bendable region 2 with the first direction, that is, the thickness direction of the bendable region 2 and the first direction are intersected to define a first reference plane which is parallel to the first datum plane A1. As a result, the disposal of the oblique holes 30a may adjust to the bending of the support plate 100 along the thickness direction better so as to improve the bending performance of the bendable region 2 along the thickness direction.

A plurality of hole groups 3A are disposed in the bendable region 2, that is, a plurality of hole groups 3A are disposed in a part of the support plate 100 located in the bendable region 2, and at least two of a plurality of holes 30 in the bendable region 2 are formed as the oblique holes 30a. In the descriptions of the present disclosure, "a plurality" means two or more.

During a bending process of the bendable region 2, the shape and form of the bendable region 2 may be changed. For example, as shown in FIGS. 1 and 2, the bendable region 2 is in a flat-extended state. At this time, the bendable region 2 and the flat region 1 may be located in a same plane, and the support plate 100 may be in a flat plate structure.

The bendable region 2 may also be in a bent state. At this time, the bendable region 2 and the flat region 1 are not located in a same plane, and the part of the support plate 100 located in the bendable region 2 may extend along a curved line in the first direction and the thickness direction. The central axis L1 of the oblique hole 30a intersects with the thickness direction of the bendable region 2 at a non-zero included angle, and the central axis L1 of the oblique hole 30a is located in the first datum plane A1. It may be understood that in the first datum plane A1, the central axis L1 of the oblique hole 30a intersects with a thickness direction of a position of the bendable region 2 where the oblique hole 30a is located at a non-zero included angle. The thickness direction of the bendable region 2 may be understood as a direction normal to a central surface bisecting the thickness of a part of the support plate located in the bendable region 2. When the central surface bisecting the thickness of the bendable region 2 is a plane (for example, the bendable region 2 is in a flat-extended state), the thickness direction of the bendable region 2 is unique. When the central surface bisecting the thickness of a bendable section is a curved surface (for example, the bendable region 2 is in a bent state), the thickness direction of a particular position of the bendable region 2 may be understood as a direction normal to a central surface bisecting the thickness at the above position.

The structures in which straight holes and oblique holes are disposed in the support plate respectively are simulated respectively and compared in terms of mechanical property at the time of bending, which further proves that disposal of the oblique holes in the support plate can improve the bending performance of the support plate.

Two support plates of 130 mm*160 mm*0.03 mm are constructed. One straight hole is opened in one support plate, for example, in the middle of the support plate, and a central axis of the straight hole is parallel to the thickness direction of the support plate. One oblique hole is opened in the other support plate, for example, in the middle of the support plate, a central axis of the oblique hole intersects with the thickness direction of the support plate at an included angle of 15°, and the central axis of the oblique hole is located in a longitudinal section of the support plate, that is, the central axis of the oblique hole is located in a plane where the support plate bends to deform. Two ends of the two support plates are fixed, and then a uniformly-distributed load of 100 MPa is applied on the support plates and stress distributions of the two support plates are determined. Through comparison of results, it is found that for the support plate with the straight hole, its maximum stress occurs to the fixing positions of the two ends, whereas for the support plate with the oblique hole, its maximum stress occurs to an edge of the oblique hole rather than to the flat surface of the support plate; and the two maximum stress values of the two support plates differ little. As a result, when the oblique hole 30a is disposed in the bendable region 2 of the support plate 100, the maximum stress of the support plate 100 is concentrated on the edge of the oblique hole 30a rather than on the flat region 1 of the support plate 100 due to the mechanical property of the oblique hole 30a. Therefore, when the support plate 100 is used to support a flexible display panel, the impact on an optical clear adhesive (for example, OCA2) layer between the support plate 100 and the flexible display panel when the support plate 100 is bent is effectively reduced, and a force received by the optical clear adhesive during bending is decreased, thus reducing a risk of peeling. In this way, the connection reliability between the support plate 100 and the flexible display panel is guaranteed.

In the related arts, a pattern structure is disposed on the support plate, the pattern structure is one or more straight holes and a central axis of the straight holes is parallel to a thickness of the pattern region of the support plate. In the present disclosure, at least two of a plurality of holes 30 in the bendable region 2 are formed as oblique holes 30a and the central axis L1 of the oblique hole 30a is intersected with the thickness direction of the bendable region 2 at a non-zero included angle, which further optimizes the structural performance of the support plate 100 and improves the bending performance of the support plate 100.

As a result, according to an embodiment of the present disclosure, by disposing one or more oblique holes 30a in the bendable region 2 of the support plate 100, the central axis of the oblique holes 30a is located in the first datum plane A1, so as to improve the stress distribution of the support plate 100 when the support plate 100 is bent along the thickness direction, and optimize the overall performance of the support plate 100, thereby enhancing the bending performance of the support plate 100.

Optionally, the holes 30 may be formed into round holes, elliptical holes or polygonal holes or the like.

Figure 3:
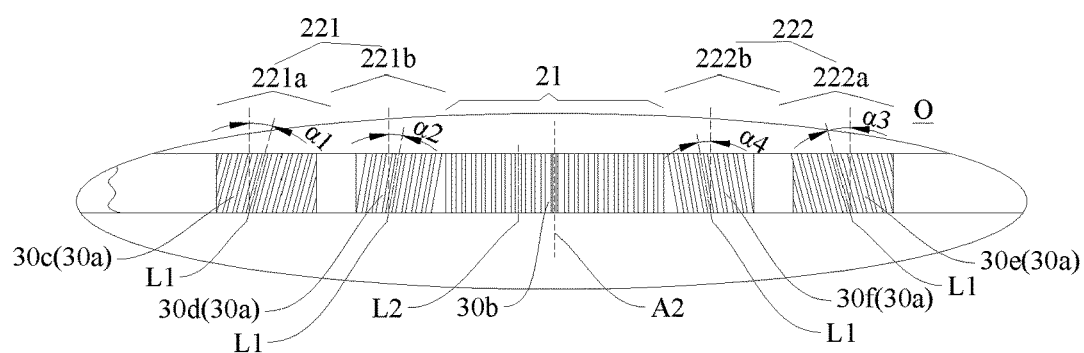
FIG. 3 is an enlarged view of a part O circled in FIG. 2.

In some embodiments, as shown in FIGS. 1 and 3, a plurality of holes of at least one of a plurality of hole groups 3A in the part of the pattern region 3 covering the bendable region 2 are formed as oblique holes 30a, such that at least one hole group 3A is formed as an oblique hole 30a group, and the oblique hole 30a group includes a plurality of oblique holes 30a at intervals along the second direction. In this way, the disposal manner of the oblique holes 30a is matched with the bending direction of the bendable region 2 to facilitate improving the bending performance of the bendable region 2 along the thickness direction, thus improving the bending performance of the support plate 100.

Figure 4:
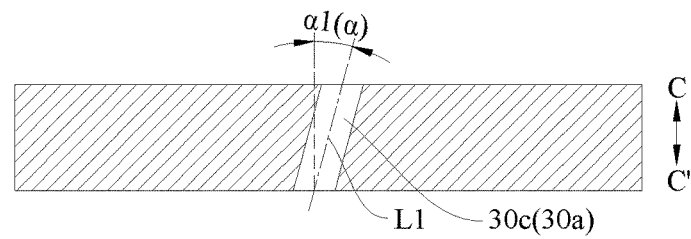
FIG. 4 is a schematic diagram of a first oblique hole shown in FIG. 3.
Figure 5:
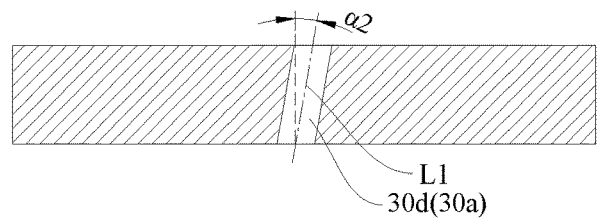
FIG. 5 is a schematic diagram of a second oblique hole shown in FIG. 3.
Figure 6:
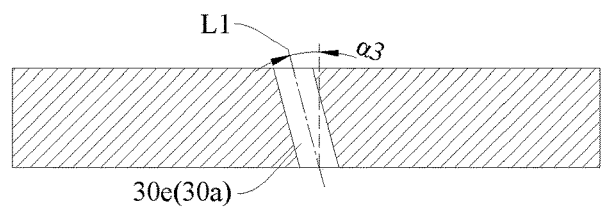
FIG. 6 is a schematic diagram of a third oblique hole shown in FIG. 3.
Figure 7:
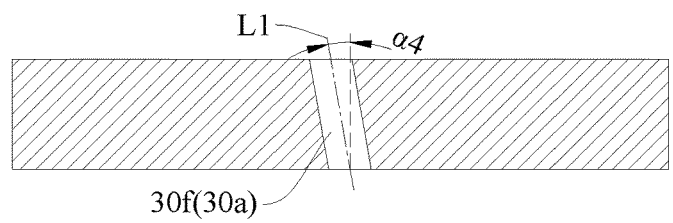
FIG. 7 is a schematic diagram of a fourth oblique hole shown in FIG. 3.
Figure 8:
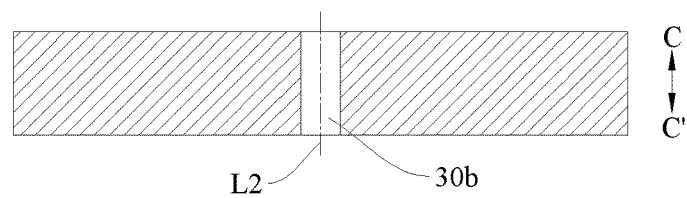
FIG. 8 is a schematic diagram of a straight hole shown in FIG. 3.

In some embodiments, as shown in FIG. 4, the included angle $\alpha$ between the central axis L1 of the oblique hole 30a and the thickness direction of the bendable region 2 satisfies $0° < \alpha \leq 45°$, for example, the included angle $\alpha$ may be 10°, 15°, 20°, 30°, or 45° or the like, which diversifies the design of the support plate 100 to satisfy the actual needs better.

It is to be understood that the included angles between the central axes L1 of a plurality of oblique holes 30a in the bendable region 2 and the thickness direction of the bendable region 2 may be all equal or all not equal as follows: 1. the included angles between the central axes L1 of a plurality of oblique holes 30a and the thickness direction of the bendable region 2 are all equal; 2. the included angles between the central axes L1 of any two of a plurality of oblique holes 30a and the thickness direction of the bendable region 2 are unequal, that is, none of the included angles between the central axes L1 of a plurality of oblique holes 30a and the thickness direction of the bendable region 2 is equal; 3. the included angles between the central axes L1 of at least two of a plurality of oblique holes 30a and the thickness direction of the bendable region 2 are equal, but not equal to the included angles between the central axes L1 of other oblique holes 30a and the thickness direction of the bendable region 2. In other words, the central axes L1 of a plurality of oblique holes 30a in the bendable region 2 are parallel to each other, or the central axis L1 of at least one of a plurality of oblique holes 30a is not parallel to the central axes L1 of other oblique holes 30a. Thus, the diversified designs of the support plate 100 are further facilitated.

Further, the included angle $\alpha$ between the central axis L1 of the oblique holes 30a and the thickness direction of the bendable region 2 satisfies $0° < \alpha \leq 30°$, such that the included angle between the central axis L1 of the oblique holes 30a and the thickness direction of the bendable region 2 is appropriately reduced to facilitate processing the oblique holes 30a under the precondition of ensuring the bending performance of the support plate 100.

Figure 10:
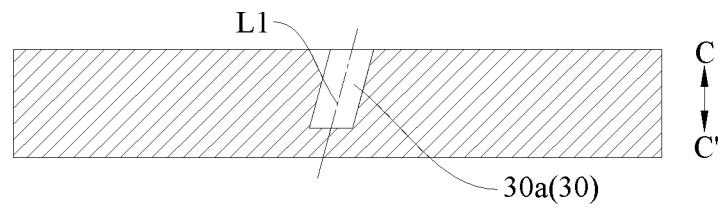
FIG. 10 is a schematic diagram of an oblique hole according to another embodiment of the present disclosure.
Figure 11:
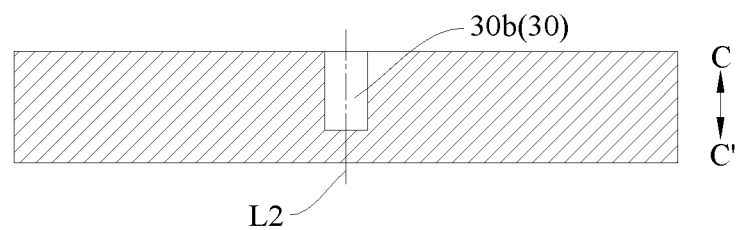
FIG. 11 is a schematic diagram of a straight hole according to another embodiment of the present disclosure.

In some embodiments, as shown in FIGS. 3-8, a plurality of holes 30 in the bendable region 2 are all formed as through holes. Therefore, in the thickness direction of the bendable region 2, each hole 30 in the bendable region 2 communicates the surfaces of both sides, along the thickness direction, of the support plate 100. The present disclosure is not limited hereto. In some other embodiments, as shown in FIGS. 10 and 11, a plurality of holes 30 in the bendable region 2 are all formed as blind holes. Therefore, in the thickness direction of the bendable region 2, none of the holes 30 in the bendable region 2 penetrates through the support plate 100. In some other embodiments, at least one of a plurality of holes 30 in the bendable region 2 is formed into a through hole, and at least one of a plurality of holes 30 is formed into a blind hole. Therefore, in the thickness direction of the bendable region 2, at least one of a plurality of holes 30 penetrates through the support plate 100 and at least one of the plurality of holes 30 does not penetrate through the support plate 100.

As a result, a plurality of holes 30 in the bendable region 2 may be flexibly disposed such that the structures of the support plate 100 are diversified, thus better satisfying the actual needs.

Figure 12:
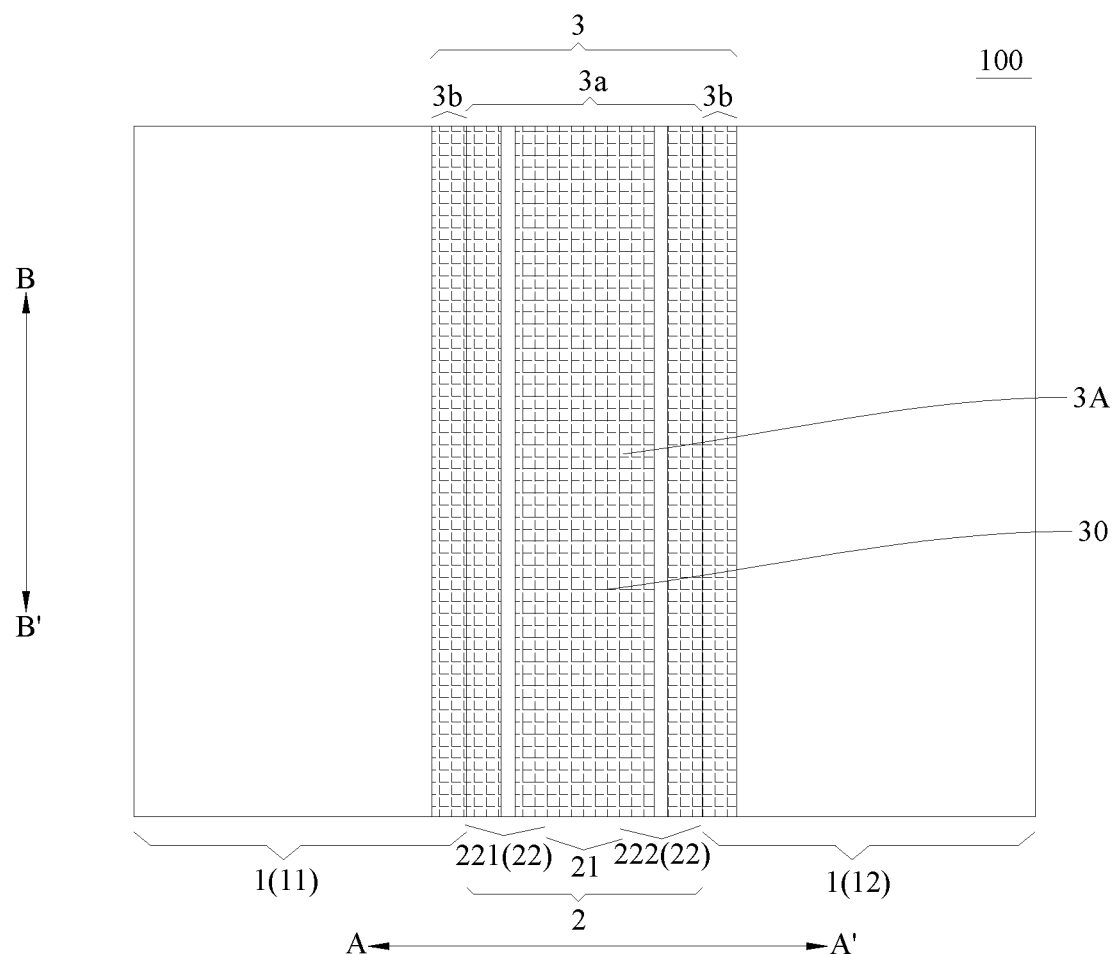
FIG. 12 is a schematic diagram of a support plate according to still another embodiment of the present disclosure.

In some embodiments, as shown in FIG. 12, the pattern region 3 includes a first pattern region 3a and a second pattern region 3b, and a plurality of hole groups 3A are disposed in each of the first pattern region 3a and the second pattern region 3b. The first pattern region 3a covers the bendable region 2 and the second pattern region 3b covers a part of the flat region 1. Thus, the pattern region 3 covers the entire bendable region 2, and also covers a part of at least one of the first flat region 11 and the second flat region 12, for example, covers a part of the first flat region 11, or a part of the second flat region 12, or both a part of the first flat region 11 and a part of the second flat region 12. In this case, a plurality of hole groups 3A may be disposed in the bendable region 2 and a plurality of hole groups 3A may also be disposed in a part of at least one of the first flat region 11 and the second flat region 12. Therefore, the stress distribution of the flat region 1 may be improved and the structural performance of the flat region 1 can be guaranteed.

In some embodiments, an area of the pattern region 3 is made not to exceed ⅓ of a sum of areas of the flat region 1 and the bendable region 2, so as to ensure the rigidity of the support plate 100 and avoid stamping resulting from the excessively large area of the pattern region 3 at the same time.

In some embodiments, a plurality of holes 30 in the pattern region 3 are all formed into oblique holes 30a. At this time, the central axes of the plurality of oblique holes 30a may be parallel or unparallel to each other. It may be understood that when the pattern region 3 only covers the bendable region 2, a plurality of holes 30 in the bendable region 2 are all formed into oblique holes 30a; when the pattern region 3 covers the bendable region 2 and also covers a part of the flat region 1, a plurality of holes 30 in the bendable region 2 and a plurality of holes 30 in the flat region 1 are all formed into oblique holes 30a.

Of course, the present disclosure is not limited hereto. In some other embodiments, as shown in FIG. 3, at least two of a plurality of holes 30 in a part of the pattern region 3 covering the bendable region 2 are formed into straight holes 30b, and thus at least two of a plurality of holes 30 in the bendable region 2 are formed into straight holes 30b. A central axis L2 of the straight holes 30b is parallel to the thickness direction of the bendable region 2 and thus an included angle between the central axis L2 of the straight holes 30b and the thickness direction of the bendable region 2 is 0°.

As a result, the structure of a plurality of holes 30 in the pattern region 3 may be flexibly disposed, thus diversifying the structures of the support plate 100.

In some embodiments, as shown in FIG. 1, the bendable region 2 has a centerline 2a which extends along the second direction. A plurality of holes groups 3A are disposed symmetrical about the centerline 2a and thus the oblique holes 30a in the plurality of holes 30 are also disposed symmetrical about the centerline 2a. Therefore, the bending performance of the support plate 100 can be improved in a balanced way. In some embodiments, the plurality of hole groups 3A in the pattern region 3 may be disposed asymmetrical about the centerline 2a.

In some embodiments, the bendable region 2 includes a central bendable region 21 and a plurality of transitional bendable regions 22 arranged along the first direction, and the plurality of transitional bendable regions 22 include one or more first transitional bendable regions 221 and one or more second transitional bendable regions 222. As shown in FIG. 1, one first transitional bendable region 221 and one second transitional bendable region 222 are disposed at both sides of the central bendable region 21 along the first direction and are symmetrical about the central bendable region 21. Therefore, the one or more first transitional bendable regions 221 and the one or more second transitional bendable regions 222 may be disposed symmetrical about the centerline 2a of the bendable region 2, the one or more first transitional bendable regions 221 are connected between the central bendable region 21 and the first flat region 11, and the one or more second transitional bendable regions 222 are connected between the central bendable region 21 and the second flat region 12. In this way, the support plate 100 can be better suitable for a flexible display panel, for example, a water drop-shaped flexible display screen, so as to achieve good supporting effect for the flexible display panel. A plurality of hole groups 3A are disposed in each of the central bendable region 21 and the plurality of transitional bendable regions 22. A plurality of holes 30 of a plurality of hole groups 3A in the transitional bendable regions 22 are all formed into oblique holes 30a, which effectively improves the bending performance of the transitional bendable regions 22 and guarantees the bending transition between the central bendable region 21 and the flat region 1. At the same time, the different requirements of the central bendable region 21 and the transitional bendable regions 22 for the bending performance can be met. The central axes L1 of a plurality of oblique holes 30a in the transitional bendable regions 22 may be parallel or unparallel to each other.

In some embodiments, as shown in FIGS. 1 and 3, a plurality of hole groups 3A are disposed in each of the central bendable region 21 and the transitional bendable regions 22. A plurality of holes 30 of a plurality of hole groups 3A in the transitional bendable regions 22 are all formed into oblique holes 30a, and the bendable region 2 has a centerline 2a extending along the second direction. During a bending process of the bendable region 2, the centerline 2a may be taken as a bending axis of the bendable region 2. A plurality of hole groups 3A in the pattern region 3 are disposed symmetrical about the centerline 2a and thus a plurality of hole groups 3A in the central bendable region 21 are disposed symmetrical about the centerline 2a, and a plurality of oblique holes 30a in the transitional bendable regions 22 are disposed symmetrical about the centerline 2a. Thus, during a bending process of the bendable region 2, the support plate 100 can be still kept symmetrical about the centerline 2a to ensure the regular bending shape of the support plate 100, so as to better match with the flexible display panel.

It may be understood that when the holes 30 in the transitional bendable regions 22 are all formed into oblique holes 30a, the holes 30 in the central bendable region 21 are all formed into straight holes 30b, or the holes 30 in the central bendable region 21 are all formed into oblique holes 30a, or some of the holes 30 in the central bendable region 21 are formed into straight holes 30b and the remaining are formed into oblique holes 30a.

In some embodiments, as shown in FIGS. 2 and 3, the central axes L1 of the oblique holes 30a in the first transitional bendable region 221 and the second transitional bendable region 222 are all located in the first datum plane A1. The bendable region 2 has a centerline 2a extending along the second direction. During a bending process of the bendable region 2, the centerline 2a may be taken as a bending axis of the bendable region 2. The first transitional bendable region 221 and the second transitional bendable region 222 are disposed symmetrical about the centerline 2a, and the oblique holes 30a in the first transitional bendable region 221 and the oblique holes 30a in the second transitional bendable region 222 are disposed symmetrical about the centerline 2a.

When the bendable region 2 is in an flat-extended state, in the thickness direction of the support plate 100, the central axes L1 of the oblique holes 30a in the first transitional bendable region 221 and the central axis L1 of the oblique holes 30a in the second transitional bendable region 222 may extend towards each other or away from each other, so as to ensure balanced improvement of the bending performance of the support plate 100. At the same time, the disposal of the oblique holes 30a may help to better adjust to and fit the bending along the thickness direction. For example, in a thickness direction from one side of the support plate 100 to the other side of the support plate 100, the central axes L1 of the oblique holes 30a in the first transitional bendable region 221 incline towards the central bendable region 21, and the central axes L1 of the oblique holes 30a in the second transitional bendable region 222 incline towards the central bendable region 21; or, in the thickness direction from one side of the support plate 100 to the other side of the support plate 100, the central axes L1 of the oblique holes 30a in the first transitional bendable region 221 incline away from the central bendable region 21, and the central axes L1 of the oblique holes 30a in the second transitional bendable region 222 extends away from the central bendable region 21.

In some embodiments, as shown in FIG. 3, the holes 30 in the central bendable region 21 are formed into straight holes 30b, and central axes L2 of the straight holes 30b are parallel to the thickness direction of the bendable region 2 to satisfy the bending performance of the central bendable region 21. Of course, the present disclosure is not limited hereto. In some other embodiments, the holes 30 in the central bendable region 21 are all formed into oblique holes 30a and the central axes L1 of the oblique holes 30a in the central bendable region 21 are all located in a second datum plane A2 which is parallel to a plane formed by intersecting the thickness direction of the bendable region 2 with the second direction. The thickness direction of the bendable region 2 and the second direction are intersected to define a second reference plane which is parallel to the second datum plane A2, so as to facilitate symmetric disposal of the holes 30 in the central bendable region 21 with respect to the centerline 2a of the bendable region 2 and balanced improvement of the bending performance of the central bendable region 21 in the thickness direction.

Figure 9:
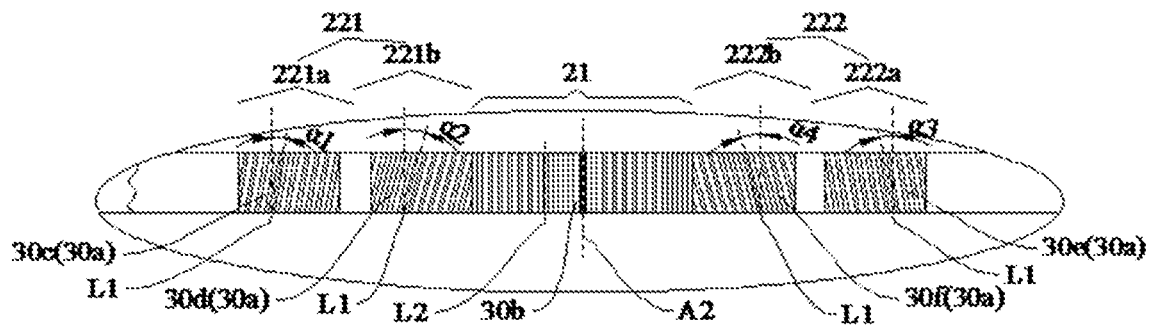
FIG. 9 is a schematic diagram of a support plate according to another embodiment of the present disclosure.

In some embodiments, as shown in FIGS. 3 and 9, the oblique holes 30a in the first transitional bendable region 221 include first oblique holes 30c and second oblique holes 30d, and the central axis L1 of the first oblique holes 30c and the central axis L1 of the second oblique holes 30d are unparallel to each other to satisfy different requirements of different positions of the first transitional bendable region 221 for the bending performance. The oblique holes 30a in the second transitional bendable region 222 include third oblique holes 30e and fourth oblique holes 30f, and the central axis L1 of the third oblique holes 30e and the central axis L1 of the fourth oblique holes 30f are unparallel to each other to satisfy different requirements of different positions of the second transitional bendable region 222 for the bending performance.

It may be understood that when a plurality of hole groups 3A in the bendable region 2 are disposed symmetrical about the centerline 2a, the first oblique holes 30c and the third oblique holes 30e are symmetric about the centerline 2a, and the second oblique holes 30d and the fourth oblique holes 30f are symmetric about the centerline 2a.

In some embodiments, as shown in FIG. 9, in the first direction, the included angle between the central axis of the oblique holes 30a in the first transitional bendable region 221 and the thickness direction of the bendable region 2 increases along a direction towards the central bendable region 21; likewise, the included angle between the central axis of the oblique holes 30a in the second transitional bendable region 222 and the thickness direction of the bendable region 2 increases along a direction towards the central bendable region 21.

As shown in FIG. 9, in the first direction, the second oblique holes 30d are located between the first oblique holes 30c and the central bendable region 21, and thus, in the first direction, a distance between the second oblique holes 30d and the central bendable region 21 is smaller than a distance between the first oblique holes 30c and the central bendable region 21, and the included angle $\alpha1$ between the central axis L1 of the first oblique holes 30c and the thickness direction of the bendable region 2 is smaller than the included angle $\alpha2$ between the central axis L1 of the second oblique holes 30d and the thickness direction of the bendable region 2. In the first direction, the fourth oblique holes 30f are located between the third oblique holes 30e and the central bendable region 21, and thus in the first direction, a distance between the fourth oblique holes 30f and the central bendable region 21 is smaller than a distance between the third oblique holes 30e and the central bendable region 21, and the included angle $\alpha3$ between the central axis L1 of the third oblique holes 30e and the thickness direction of the bendable region 2 is smaller than the included angle $\alpha4$ between the central axis L1 of the fourth oblique holes 30f and the thickness direction of the bendable region 2. In this way, the gradual change of the inclination angle of the oblique holes 30a in the transitional bendable regions 22 of the support plate 100 can be realized, which facilitates the balanced improvement of the bending performance of the support plate 100, and further optimizes the bending performance of the support plate 100.

In some other embodiments, as shown in FIG. 3, in the first direction, the included angle between the central axis of the oblique holes 30a in the first transitional bendable region 221 and the thickness direction of the bendable region 2 decreases along a direction towards the central bendable region 21; likewise, the included angle between the central axis of the oblique holes 30a in the second transitional bendable region 222 and the thickness direction of the bendable region 2 decreases along a direction towards the central bendable region 21.

As shown in FIG. 3, in the first direction, the second oblique holes 30d are located between the first oblique holes 30c and the central bendable region 21, and thus, in the first direction, a distance between the second oblique holes 30d and the central bendable region 21 is smaller than a distance between the first oblique holes 30c and the central bendable region 21, and the included angle α1 between the central axis L1 of the first oblique holes 30c and the thickness direction of the bendable region 2 is greater than the included angle α2 between the central axis L1 of the second oblique holes 30d and the thickness direction of the bendable region 2. In the first direction, the fourth oblique holes 30f are located between the third oblique holes 30e and the central bendable region 21, and thus in the first direction, a distance between the fourth oblique holes 30f and the central bendable region 21 is smaller than a distance between the third oblique holes 30e and the central bendable region 21, and the included angle α3 between the central axis L1 of the third oblique holes 30e and the thickness direction of the bendable region 2 is greater than the included angle α4 between the central axis L1 of the fourth oblique holes 30f and the thickness direction of the bendable region 2. In this way, the gradual change of the inclination angle of the oblique holes 30a in the transitional bendable regions 22 of the support plate 100 can also be realized, which further optimizes the bending performance of the support plate 100.

In some embodiments, as shown in FIGS. 3 and 9, the first transitional bendable region 221 includes a first transition region 221a and a second transition region 221b disposed along the first direction. An end of the first transition region 221a away from the second transition region 221b is connected with the first flat region 11, and an end of the second transition region 221b away from the first transition region 221a is connected with the central bendable region 21. Thus, the first transition region 221a is connected between the first flat region 11 and the second transition region 221b, and the second transition region 221b is connected between the first transition region 221a and the central bendable region 21. The oblique holes 30a in the first transition region 221a are all first oblique holes 30c, and the oblique holes 30a in the second transition region 221b are all second oblique holes 30d. For example, in the examples of the FIGS. 1-3 and FIG. 9, the first oblique holes 30c in the first transition region 221a are arranged in multiple rows and multiple columns along the first and second directions respectively, and the second oblique holes 30d in the second transition region 221b are arranged in multiple rows and multiple columns along the first and second directions, respectively.

The second transitional bendable region 222 includes a third transition region 222a and a fourth transition region 222b disposed along the first direction. An end of the third transition region 222a away from the fourth transition region 222b is connected with the second flat region 12, and an end of the fourth transition region 222b away from the third transition region 222a is connected with the central bendable region 21. Therefore, the third transition region 222a is connected between the second flat region 12 and the fourth transition region 222b, and the fourth transition region 222b is connected between the third transition region 222a and the central bendable region 21. The oblique holes 30a in the third transition region 222a are all third oblique holes 30e, and the oblique holes 30a in the fourth transition region 222b are all fourth oblique holes 30f. For example, in the examples of the FIGS. 1-3 and FIG. 9, the third oblique holes 30e in the third transition region 222a are arranged in multiple rows and multiple columns along the first and second directions respectively, and the fourth oblique holes 30f in the fourth transition region 222b are arranged in multiple rows and multiple columns along the first and second directions, respectively. As a result, under the precondition of ensuring the bending performance of the sup-port plate 100, the structural simplification and the processing of the support plate 100 are facilitated.

For example, in the example shown in FIG. 9, the included angle α1 between the central axis L1 of the first oblique holes 30c and the thickness direction of the bendable region 2 is 10°, the included angle α2 between the central axis L1 of the second oblique holes 30d and the thickness direction of the bendable region 2 is 15°, the included angle α3 between the central axis L1 of the third oblique holes 30e and the thickness direction of the bendable region 2 is 10°, and the included angle α4 between the central axis L1 of the fourth oblique holes 30f and the thickness direction of the bendable region 2 is 15°. The angles of α1, α2, α3 and α4 are not limited hereto. For example, α1, α2, α3 and α4 may be any value in the range of 0°-30° (including 30°) as long as such values satisfy α1<α2 and α3<α4.

For another example, in the examples shown in FIGS. 1-7, the included angle α1 between the central axis L1 of the first oblique holes 30c and the thickness direction of the bendable region 2 is 15°, the included angle α2 between the central axis L1 of the second oblique holes 30d and the thickness direction of the bendable region 2 is 10°, the included angle α3 between the central axis L1 of the third oblique holes 30e and the thickness direction of the bendable region 2 is 15°, and the included angle α4 between the central axis L1 of the fourth oblique holes 30f and the thickness direction of the bendable region 2 is 10°. The angles of α1, α2, α3 and α4 are not limited hereto. For example, α1, α2, α3 and α4 may be any value in the range of 0°-30° (including 30°) as long as such values satisfy α1>α2 and α3>α4.

In some embodiments, the support plate 100 is a stainless steel plate, for example, SUS. Thus, the support plate 100 has relatively good hardness and rigidity and can provide good overall supporting and rigidity reinforcement to the flexible display panel, thus achieving the reinforcing effect. Of course, the support plate 100 may also be made pf another material.

An embodiment of the present disclosure further provides a display apparatus 200 including a display panel 101 and the support plate 100 according to any of the above embodiments of the present disclosure. The support plate 100 is supported at a backside of the display panel 101, where the "backside" herein may be understood as a side of the display panel 101 away from a user.

Figure 13:
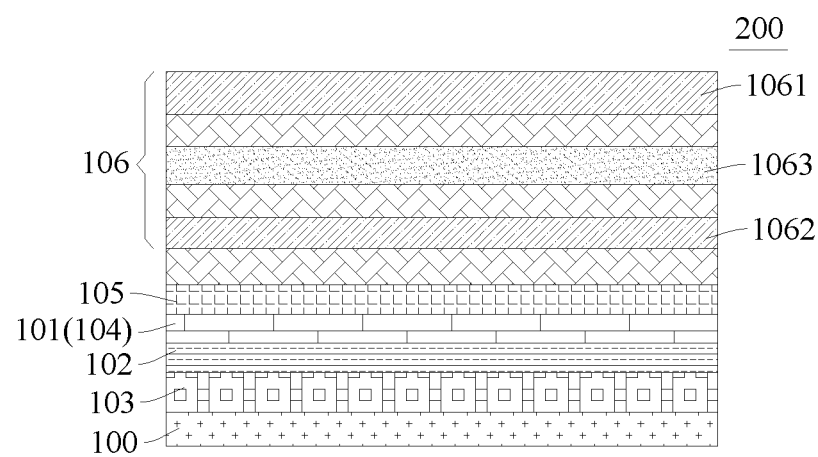
FIG. 13 is a sectional view of a display apparatus according to an embodiment of the present disclosure.

In some embodiments, as shown in FIG. 13, a back film (BF) 102 and a heat dissipating film layer 103 (e.g. foam) are disposed between the display panel 101 and the support plate 100. The back film 102 is located between the display panel 101 and the heat dissipating film layer 103. A touch module 104 (e.g. Flexible Multi-Layer On Cell, FMLOC), a light filtering module 105 (e.g. POL) and a cover plate 106 are disposed at a front side of the display panel 101. The touch module 104 and the light filtering module 105 are both located between the display panel 101 and the cover plate 106, and the touch module 104 is located between the light filtering module 105 and the display panel 101. In this case, the reliability of the display apparatus 200 can be effectively guaranteed.

For example, the cover plate 106 is connected with the light filtering module 105 by use of an optical clear adhesive. The cover plate 106 includes a first sub-cover plate 1061, a second sub-cover plate 1062 and UTG (Ultra Thin Glass) 1063. The UTG 1063 is located between the first sub-cover plate 1061 and the second sub-cover plate 1062, and UTG 1063 is connected with the first sub-cover plate 1061 and the second sub-cover plate 1062 through the optical clear adhesive respectively.

By use of the above support plate 100, it can be guaranteed that the display apparatus 200 according to the embodiments of the present disclosure has good bending performance.

An embodiment of the present disclosure further provides an electronic device including the display apparatus 200 according to any of the above embodiments of the present disclosure.

By use of the above display apparatus 200, the bending performance of the electronic device according to the embodiment of the present disclosure can be improved.

Optionally, the electronic device may be a foldable phone, a foldable computer or the like.

Other compositions and operations of the electronic device according to the embodiments of the present disclosure are known to those skilled in the art and thus will not be repeated herein.

By referring to FIGS. 1-8, the support plate 100 of the embodiments of the present disclosure will be detailed below in combination with a specific embodiment. It should be understood that the descriptions below are merely illustrative rather than limiting of the present disclosure.

As shown in FIGS. 1-3, the support plate 100 includes the flat region 1, the bendable region 2 and the pattern region 3. The flat region 1 includes the first flat region 11 and the second flat region 12 spaced apart along the first direction. The bendable region 2 includes the central bendable region 21, the first transitional bendable region 221 and the second transitional bendable region 222 disposed along the first direction. The first transitional bendable region 221 and the second transitional bendable region 222 are disposed at both sides of the central bendable region 21 along the first direction and are symmetrical about the central bendable region 21. The first transitional bendable region 221 is connected between the central bendable region 21 and the first flat region 11, and the second transitional bendable region 222 is connected between the central bendable region 21 and the second flat region 12. The pattern region 3 only covers the entire bendable region 2. A plurality of hole groups 3A arranged along the first direction are disposed in the pattern region 3, and each of the plurality of hole groups 3A includes a plurality of holes 30 at intervals along the second direction. Thus, a plurality of holes 30 are disposed in each of the central bendable region 21, the first transitional bendable region 221 and the second transitional bendable region 222. It is to be noted that the second direction is perpendicular to the first direction.

As shown in FIG. 3, the plurality of holes 30 in the first transitional bendable region 221 and the plurality of holes 30 in the second transitional bendable region 222 are all formed into oblique holes 30a. The oblique holes 30a in the first transitional bendable region 221 and the oblique holes 30a in the second transitional bendable region 222 are disposed symmetrical about the centerline 2a of the bendable region 2 extending along the second direction, and the central axes L1 of the oblique holes 30a in the first transitional bendable region 221 and the central axes L1 of the oblique holes 30a in the second transitional bendable region 222 are all located in the first datum plane A1. The plurality of holes 30 in the central bendable region 21 are all formed into straight holes 30b. The central axes L1 of the oblique holes 30a intersect with the thickness direction of the bendable region 2 at a non-zero included angle, the central axes of the straight holes 30b are parallel to the thickness direction of the bendable region 2, and the first datum plane A1 is parallel to a plane formed by intersecting the thickness direction of the bendable region 2 with the first direction.

As shown in FIG. 3, the first transitional bendable region 221 includes the first transition region 221a and the second transition region 221b disposed along the first direction. An end of the first transition region 221a away from the second transition region 221b is connected with the first flat region 11, and an end of the second transition region 221b away from the first transition region 221a is connected with the central bendable region 21. The second transitional bendable region 222 includes the third transition region 222a and the fourth transition region 222b disposed along the first direction. An end of the third transition region 222a away from the fourth transition region 222b is connected with the second flat region 12, and an end of the fourth transition region 222b away from the third transition region 222a is connected with the central bendable region 21.

The oblique holes 30a in the first transitional bendable region 221 include first oblique holes 30c and second oblique holes 30d, the first oblique holes 30c are formed in the first transition region 221a, and the second oblique holes 30d are formed in the second transition region 221b. The oblique holes 30a in the second transitional bendable region 222 include third oblique holes 30e and fourth oblique holes 30f, the third oblique holes 30e are formed in the third transition region 222a, and the fourth oblique holes 30f are formed in the fourth transition region 222b. The first oblique holes 30c and the third oblique holes 30e are disposed symmetrical about the centerline 2a, and the second oblique holes 30d and the fourth oblique holes 30f are disposed symmetrical about the centerline 2a. The included angle α1 between the central axes L1 of the first oblique holes 30c and the thickness direction of the bendable region 2 and the included angle α3 between the central axes L1 of the third oblique holes 30e and the thickness direction of the bendable region 2 both are 15°, and the included angle α2 between the central axes L1 of the second oblique holes 30d and the thickness direction of the bendable region 2 and the included angle α4 between the central axes L1 of the fourth oblique holes 30f and the thickness direction of the bendable region 2 both are 10°.

In the description of the present disclosure, it is to be understood that orientations or positional relationships indicated by terms such as "center", "thickness", "vertical", "horizontal", "top", "bottom", "inside", "outside", "axial" and "radial" and "circumferential" are based on orientations or positional relationships shown in the drawings and are used only for convenience and simplification of descriptions of the present disclosure, rather than indicating or implying that the indicated apparatus or element shall have a specific orientation or be constructed or operated in a specific orientation. Thus, the terms shall not be understood as limiting of the present disclosure.

In addition, terms "first" and "second" are used only for descriptions and shall not be understood as indicating or implying relative importance or implying a number of the indicated technical features. Thus, features limited by "first" and "second" may explicitly or implicitly include one or more features. In the descriptions of the present disclosure, "a plurality" refers to two or more unless otherwise stated clearly.

In the present disclosure, the terms such as "installed", "mutually connected", "connected" and "fixed" are to be broadly understood unless otherwise clearly stated and defined. For example, two elements may be fixedly connected, detachably connected, or integrated into one piece; may be mechanically connected, electrically connected or communicably connected; or may be directly connected, indirectly connected by an intermediate medium, or internally communicated or mutually interacted. Persons of ordinary skill in the art may understand specific meanings of the above terms in the present disclosure according to a specific situation.

In the descriptions of the present disclosure, the descriptions made by referring to the terms "one embodiment", "some embodiments", "example", "specific example", or "some examples" mean the specific features, structures, materials or characteristics described in combination with the embodiments or examples are included in at least one embodiment or example of the present disclosure. In the specification, the illustrative descriptions of the above terms do not necessarily refer to the same embodiment or example. Furthermore, the described features, structures, materials or characteristics may be combined in an appropriate manner in any one or more embodiments or examples. Further, in a case of no contradictions, those skilled in the art may combine different embodiments or examples, or features of different embodiments or examples in the specification.

Although the embodiments of the present disclosure are illustrated and described, those skilled in the art may understand that various changes, modifications, substitutions and variations may be made to these embodiments without departing from the principle and tenet of the present disclosure, and the scope of protection of the present disclosure is defined by the claims and equivalents thereof.

What is claimed is:

1. A support plate, comprising:
   a plurality of flat regions, comprising a first flat region and a second flat region spaced apart along a first direction;
   a bendable region, connected between the first flat region and the second flat region;
   a pattern region, covering at least the bendable region, wherein a plurality of hole groups arranged along the first direction are disposed in the pattern region, each of the hole groups comprises a plurality of holes spaced at intervals along a second direction, at least two of the plurality of holes in a part of the pattern region covering the bendable region are formed into oblique holes, a central axis of each of the oblique holes intersects with a thickness direction of the bendable region at a non-zero included angle, wherein the second direction is perpendicular to the first direction, the central axis of each of the oblique holes is located in a first datum plane which is parallel to a plane formed by intersecting the thickness direction of the bendable region with the first direction;
   wherein the bendable region bends along the thickness direction perpendicular to the first direction and the second direction.

2. The support plate according to claim 1, wherein a plurality of holes of at least one of a plurality of hole groups in the part of the pattern region covering the bending region are formed into oblique holes.

3. The support plate according to claim 1, wherein the included angle α between the central axis of each of the oblique holes and the thickness direction of the bendable region satisfies $0°<α≤45°$.

4. The support plate according to claim 1, wherein,
   a plurality of holes in the part of the pattern region covering the bendable region are formed into through holes; or,
   the plurality of holes in the part of the pattern region covering the bendable region are formed into blind holes; or,
   at least one of the plurality of holes in the part of the pattern region covering the bendable region is formed into a through hole, and at least one of the plurality of holes is formed into a blind hole.

5. The support plate according to claim 1, wherein the pattern region comprises a first pattern region and a second pattern region, a plurality of hole groups are disposed in each of the first pattern region and the second pattern region, the first pattern region covers the bendable region, and the second pattern region covers a part of at least one of the first flat region and the second flat region.

6. The support plate according to claim 1, wherein an area of the pattern region does not exceed ⅓ of a sum of areas of the flat region and the bendable region.

7. The support plate according to claim 1, wherein,
   the plurality of holes in the pattern region are all formed into the oblique holes; or,
   at least two of the plurality of holes in the part of the pattern region covering the bendable region are formed into straight holes, and a central axis of each of the straight holes is parallel to the thickness direction of the bendable region.

8. The support plate according to claim 7, wherein the bendable region has a centerline which extends along the second direction, and the plurality of hole groups are disposed symmetrical about the centerline.

9. The support plate according to claim 7, wherein the bendable region comprises a central bendable region and a plurality of transitional bendable regions arranged along the first direction,
   the plurality of transitional bendable regions comprise a first transitional bendable region and a second transitional bendable region,
   wherein the first transitional bendable region and the second transitional bendable region are disposed at both sides of the central bendable region along the first direction and are symmetrical about the central bendable region,
   wherein the first transitional bendable region is connected between the central bendable region and the first flat region, the second transitional bendable region is connected between the central bendable region and the second flat region, a plurality of hole groups are disposed in each of the central bendable region and the transitional bendable regions, and a plurality of holes in the plurality of hole groups in the transitional bendable regions are formed into the oblique holes.

10. The support plate according to claim 9, wherein,
    the holes in the central bendable region are all formed into straight holes, and central axes of the straight holes are parallel to the thickness direction of the bendable region; or,
    the holes in the central bendable region are all formed into oblique holes, and the central axes of the oblique holes in the central bendable region are all in a second datum plane which is parallel to a plane formed by intersecting the thickness direction of the bendable region with the second direction.

11. The support plate according to claim 9, wherein,
    the oblique holes in the first transitional bendable region comprise first oblique holes and second oblique holes, and central axes of the first oblique holes are not parallel to central axes of the second oblique holes;
    the oblique holes in the second transitional bendable region comprise third oblique holes and fourth oblique holes, and central axes of the third oblique holes are not parallel to central axes of the fourth oblique holes.

12. The support plate according to claim 11, wherein in the first direction, the second oblique holes are located between the first oblique holes and the central bendable region, and in the first direction, the fourth oblique holes are located between the third oblique holes and the central bendable region;

wherein an included angle α1 between the central axes of the first oblique holes and the thickness direction of the bendable region is smaller than an included angle α2 between the central axes of the second oblique holes and the thickness direction of the bendable region, and an included angle α3 between the central axes of the third oblique holes and the thickness direction of the bendable region is smaller than an included angle α4 between the central axes of the fourth oblique holes and the thickness direction of the bendable region; or, the included angle α1 between the central axes of the first oblique holes and the thickness direction of the bendable region is greater than the included angle α2 between the central axes of the second oblique holes and the thickness direction of the bendable region, and the included angle α3 between the central axes of the third oblique holes and the thickness direction of the bendable region is greater than the included angle α4 between the central axes of the fourth oblique holes and the thickness direction of the bendable region.

13. The support plate according to claim 12, wherein the first transitional bendable region comprises a first transition region and a second transition region disposed along the first direction, an end of the first transition region away from the second transition region is connected with the first flat region, an end of the second transition region away from the first transition region is connected with the central bendable region, the oblique holes in the first transition region are all the first oblique holes, and the oblique holes in the second transition region are all the second oblique holes;

the second transitional bendable region comprises a third transition region and a fourth transition region disposed along the first direction, an end of the third transition region away from the fourth transition region is connected with the second flat region, an end of the fourth transition region away from the third transition region is connected with the central bendable region, the oblique holes in the third transition region are all the third oblique holes, and the oblique holes in the fourth transition region are all the fourth oblique holes.

14. A display apparatus, comprising a display panel and a support plate, wherein the support plate comprises:

a plurality of flat region, comprising a first flat region and a second flat region spaced apart along a first direction;

a bendable region, connected between the first flat region and the second flat region;

a pattern region, covering at least the bendable region, wherein a plurality of hole groups arranged along the first direction are disposed in the pattern region, each of the hole groups comprises a plurality of holes spaced at intervals along a second direction, at least two of the plurality of holes in a part of the pattern region covering the bendable region are formed into oblique holes, a central axis of each of the oblique holes intersects with a thickness direction of the bendable region at a non-zero included angle, wherein the second direction is perpendicular to the first direction, the central axis of each of the oblique holes is located in a first datum plane which is parallel to a plane formed by intersecting the thickness direction of the bendable region with the first direction;

the bendable region bends along the thickness direction which is perpendicular to the first direction and the second direction, and the support plate is supported at a back side of the display panel.

15. The display apparatus according to claim 14, wherein a back film and a heat dissipating film layer are disposed between the display panel and the support plate, wherein the back film is located between the display panel and the heat dissipating film layer, wherein a touch module, a light filtering module and a cover plate are disposed at a front side of the display panel, the touch module and the light filtering module are both located between the display panel and the cover plate, and the touch module is located between the light filtering module and the display panel.

16. The display apparatus according to claim 14, wherein the included angle α between the central axis of each of the oblique holes and the thickness direction of the bendable region satisfies $0°<α≤45°$.

17. The display apparatus according to claim 14, wherein, the plurality of holes in the pattern region are all formed into the oblique holes; or, at least two of the plurality of holes in the part of the pattern region covering the bendable region are formed into straight holes, and a central axis of each of the straight holes is parallel to the thickness direction of the bendable region.

18. The display apparatus according to claim 17, wherein the bendable region comprises a central bendable region and a plurality of transitional bendable regions arranged along the first direction, the plurality of transitional bendable regions comprise a first transitional bendable region and a second transitional bendable region, wherein the first transitional bendable region and the second transitional bendable region are disposed at both sides of the central bendable region along the first direction and are symmetrical about the central bendable region, wherein the first transitional bendable region is connected between the central bendable region and the first flat region, the second transitional bendable region is connected between the central bendable region and the second flat region, a plurality of hole groups are disposed in each of the central bendable region and the transitional bendable regions, and a plurality of holes in the plurality of hole groups in the transitional bendable regions are formed into the oblique holes.

19. The display apparatus according to claim 18, wherein, the oblique holes in the first transitional bendable region comprise first oblique holes and second oblique holes, and central axes of the first oblique holes are not parallel to central axes of the second oblique holes;

the oblique holes in the second transitional bendable region comprise third oblique holes and fourth oblique holes, and central axes of the third oblique holes are not parallel to central axes of the fourth oblique holes;

in the first direction, the second oblique holes are located between the first oblique holes and the central bendable region, and in the first direction, the fourth oblique holes are located between the third oblique holes and the central bendable region;

wherein an included angle α1 between the central axes of the first oblique holes and the thickness direction of the bendable region is smaller than an included angle α2 between the central axes of the second oblique holes and the thickness direction of the bendable region, and an included angle α3 between the central axes of the third oblique holes and the thickness direction of the bendable region is smaller than an included angle α4 between the central axes of the fourth oblique holes and the thickness direction of the bendable region; or, the included angle $\alpha 1$ between the central axes of the first oblique holes and the thickness direction of the bendable region is greater than the included angle $\alpha 2$ between the central axes of the second oblique holes and the thickness direction of the bendable region, and the included angle $\alpha 3$ between the central axes of the third oblique holes and the thickness direction of the bendable region is greater than the included angle $\alpha 4$ between the central axes of the fourth oblique holes and the thickness direction of the bendable region.

20. An electronic device, comprising the display apparatus according to claim 14.

\* \* \* \* \*